June 22, 1948.  R. N. BEAN  2,443,944
MEANS FOR SEALING AND TESTING
WELL HEAD CONNECTIONS
Original Filed Dec. 10, 1943  2 Sheets-Sheet 1
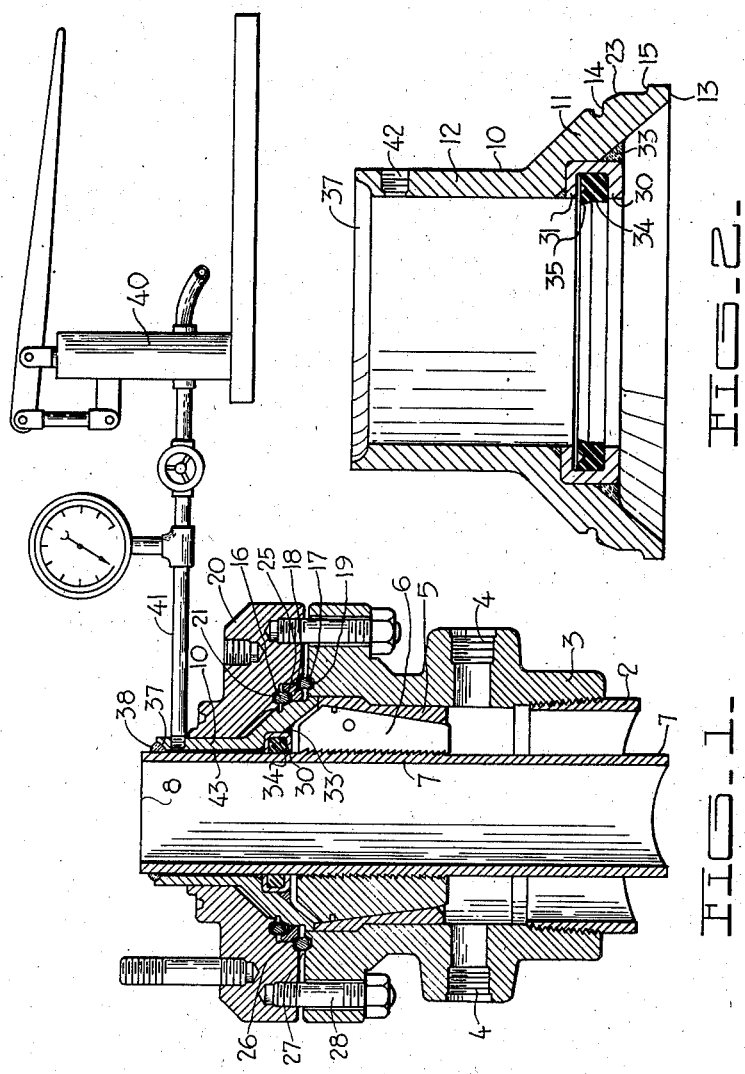
RURIC N. BEAN
*INVENTOR.*
BY
*ATTORNEYS.*

June 22, 1948.                    R. N. BEAN                      2,443,944
                        MEANS FOR SEALING AND TESTING
                              WELL HEAD CONNECTIONS
Original Filed Dec. 10, 1943                              2 Sheets-Sheet 2
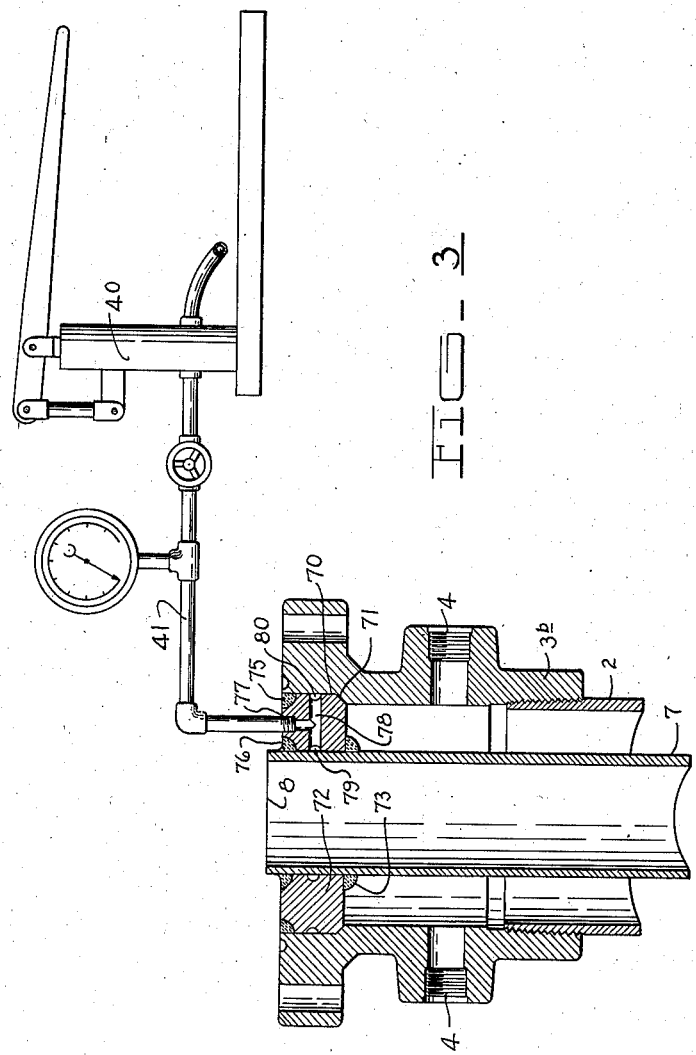
RURIC N. BEAN
*INVENTOR.*
BY
ATTORNEYS.

Patented June 22, 1948

2,443,944

UNITED STATES PATENT OFFICE 2,443,944

MEANS FOR SEALING AND TESTING WELL-HEAD CONNECTIONS

Ruric N. Bean, Houston, Tex., assignor to Cameron Iron Works, Houston, Tex., a corporation of Texas Original application December 10, 1943, Serial No. 513,750. Divided and this application January 17, 1945, Serial No. 573,228

9 Claims. (Cl. 166—14)

1

This invention relates to a means for sealing and testing well head connections where a string of pipe is to be suspended in the well bore.

The present application is a division of my prior co-pending application, Serial No. 513,750, filed December 10, 1943, now Patent No. 2,402,723 granted June 23, 1946, for Means and method of sealing and testing well head connections, which application is in turn a continuation of my prior application Serial No. 356,015, filed September 9, 1940, now abandoned, for Means and method of testing welded well head connections, and relates broadly to the subject matter of the co-pending joint application of Ruric N. Bean, James S. Abercrombie, and Herbert Allen, Serial No. 272,578, filed May 9, 1939, for Sealing and testing well head connections, now Patent No. 2,350,867 issued June 6, 1944, and is entitled to the benefit of the filing date thereof as to all common subject matter.

In completing wells drilled by the rotary method several strings of pipe may be lowered into the well bore after the drilling operation has been completed, and in order to prevent the pressures in the well bore from displacing the strings of pipe when they are landed, the practice has grown up of running the string of pipe into the well and determining the length of such string of pipe. The pipe is then cut off at the desired elevation and the upper end welded or otherwise suspended and sealed to a holddown body or flange which is in turn positioned upon the casing head or other well head member.

The production fittings are then attached above the suspended and sealed portion and the well is completed. It is necessary to separate the pressures which are present inside of the production string from the outside of the production string inside of the well casing because the higher pressure is always present in the production string and if the weld or other seal leaks this pressure will cause a flow down around the outside of the production string or casing and may cause leakage or difficulty at any one of a number of points. The present invention, therefore, concerns itself with providing two seals about the pipe, one of which may be a weld of the type referred to, so as to provide an additional safeguard against such leakage, and to provide a means for testing such seals.

It is therefore a general object of this invention to provide a pipe support and seal and make possible the testing of the seal.

It is another object of this invention to provide a pipe support wherein a string of pipe is

2 welded or otherwise sealed to the support adjacent the upper end thereof.

Another object of this invention is to provide apparatus for applying pressure to a weld or other seal at the upper end of a pipe in a well in order to test the seal for leakage.

Another object of this invention is to provide a pair of spaced seals about a casing or similar pipe, together with a means for testing such seals.

Another object of this invention is to provide a means for testing a weld or similar seal on a string of pipe by applying pressure to it as the pipe is suspended in a well.

Another object of this invention is to provide a means for applying test pressure to a pair of spaced seals about a pipe without danger of collapsing the pipe.

Other objects of this invention will become apparent from the following description taken in connection with the accompanying drawings wherein are set forth and disclosed certain embodiments of this invention, it being understood that the same are by way of illustration and example only and not by way of limitation.

In the drawings:

Fig. 1 is a vertical sectional view illustrating one embodiment of this invention and showing a string of pipe suspended in its supporting structure with suitable seals and testing means in place thereabout.

Fig. 2 is a vertical sectional view of the part which carries the seals and testing means illustrated in Fig. 1.

Fig. 3 is a view similar to Fig. 1 but illustrating still a different embodiment of the invention.

For the sake of convenience in reference, the term "casing head" is being used throughout the specification and claims to designate an annular member which may be supported by the surface casing of a well and within which a well casing or other pipe may be suspended and sealed.

In Fig. 1 the surface casing is indicated generally at 2 and the casing head 3, which in this instance constitutes a holder by which is carried the inner pipe gripping and supporting means and the annular sealing and testing body part hereinafter described, is mounted thereon. The outlets 4 are provided on the casing head and it is arranged to receive an adaptor bushing 5 and a set of slips 6 constituting an inner pipe gripping and supporting means by which the string of pipe 7 may be supported in the well until it has been properly landed. This string of pipe may be the production string of casing or any subsequent string of pipe such as the tubing which may be run into the well; and the present description is intended to apply to any or several strings of pipe which may be landed in this manner.

The string of pipe 7 is of suitable length to extend down into the well and the usual practice is to run this pipe into the well by connecting adacent sections until the desired length is in the well. The pipe is then marked at a point such as 8 at which it is to be cut off, so that the upper end will be at the desired elevation. The pipe is then cut off while suspended by the slips 6. An annular member, shown in the drawing as a holddown or attaching flange or body 10 is then slipped down over the upper end of the pipe.

The flange 10 in this instance is of peculiar construction in that it has an outstanding base portion 11 and an upstanding neck 12. The lower edge 13 is arranged to engage the upper end of the bushing 5 inside of the opening in the casing head 3.

The outer periphery of the flange 10 is beveled at 23 between shoulders 14 and 15 so that the ring 16 which rests on surface 23 will form a seal with the flange 10 and with the inclined face 25 of the spacer ring 18. The ring 17 is arranged to fit in a groove 19 in the top of a casing head, while the ring 16 fits into the cap member 20 in the groove 21 therein. The lower outer edge of the spacer ring 18 is beveled at 26 to engage the seal ring 17 which also fits in a complementary groove 27 in the cap 20. In this manner the flange 10 is held securely in position and is sealed with both the casing head 3 and the cap 20. The bolts 28 can be attached to hold the cap 20 firmly against the sealing assembly so as to clamp the flange 10 firmly in position. The flange 10 thus forms an annular body part carried by the holder and spaced axially from the pipe gripping and supporting means.

The flange 10 has a packing disposed on the inner lower portion thereof by having the ring 31 fixed in position by the welding bead 33. The ring 31 is recessed to provide an annular seal receiving zone adapted to receive a lip type of packing ring 34 having the lip portions 35 thereof facing upwardly to prevent the downward flow of pressure thereby.

The upper end of the flange 10 is recessed at 37 so as to provide a second annular seal receiving zone axially spaced from the first such zone and adapted to receive a seal in the form of the bead 38 of welding material to bond the pipe 7 to the flange or body. This arrangement is best seen in Fig. 1. It will be understood that some other form of packing may be employed in place of the welding bead 38 to provide the upper seal between the pipe and the flange or body, but the weld is ordinarily preferred because it both provides a seal and tends to assist in supporting the pipe. When the pipe 7 is in position as seen in Fig. 1, the inner periphery of the packing 34 will fit closely against the pipe and form a seal therewith. This seal will be accentuated by the introduction of pressure from a source such as the pump 40 through the pipe 41 through the opening 42 in the flange. This pressure will be confined in the area or chamber 43 formed about the pipe inside of the flange 10 and between the top weld 38 and the packing 34. In this manner any desired pressure may be applied in order to test the weld 38 to determine whether or not it will leak when subjected to pressure. Such procedure is desirable before the other fittings are fixed to the top of the well head so as to prevent the escape of pressure downwardly around the pipe 7 after the well has been placed in operation and high pressure exists within the pipe 7. The flange 10 may take various forms so long as it is capable of being sealed to the casing head or the like and to the pipe by a plurality of seals, one of which may be the welding material bonding the pipe to the flange.

Figure 3 shows another arrangement for practicing the invention, wherein the casing head 3b has a relatively shallow opening 70 therein having a beveled seat 71. The pipe 7 is arranged to have a radially extending annular member such as the flange or body 72 affixed thereto by a bead 73 of welding material. This body or flange 72 will be affixed to the pipe at the desired elevation and will serve the combined function of being attached to the pipe by the weld so as to form a seal with the pipe, and also serves to support the pipe, replacing the slips 6 of Figure 1. When this flange is connected by the weld 73, the pipe can be lowered slightly to seat the flange in the head 3b and form a seal therewith. The bead of welding 75 will be used to affix the flange to the head 3b and the second bead 76 of welding material will bond the pipe to the flange. This provides an especially rigid connection for the pipe to the head which is capable of withstanding tremendous pressures.

When it is desired to test the welds 73, 75 and 76 the pump 40 and the pipe connection 41 may be attached to the opening 77 in the top of the body of flange 72. This opening connects with the lateral passage 78, which in turn opens into the inner groove 79 and the outer groove 80. In this manner pressure can be applied around the pipe and inside of the head so as to test all three of the welds for leakage.

It will be appreciated that in the forms illustrated in the drawings, the zone around the pipe which is to be subected to the testing pressure will be free of any mechanical pressure whatsoever so that there will not be the possible tendency to collapse the pipe which might exist where the pipe is gripped by slips within the zone to which the testing pressure is applied. In other words, the pipe which is being suspended will not be called upon to withstand both the testing pressure and some other pressure such as the pressure applied by the slips in gripping the pipe to suspend the same. This is a very great advantage where exceedingly high pressures are being encountered in the well because then high test pressures must be employed, and these added to the gripping force exerted by the slips suspended the pipe might be greater than the pipe would stand. Also, in cases where such high pressures are encountered in the well it is usual that the well will be relatively deep and consequently that the weight of the pipe suspended on the slips will be great and the resulting gripping force of the slips against the pipe will be great. These cumulative factors will under such circumstances result in the placing of tremendous compressive stresses on the pipe and the likelihood of collapse of the pipe as a result thereof is greatly minimized by arrangements such as illustrated in the drawings of this application wherein the testing pressure is applied to a zone on the pipe that is not otherwise subjected to mechanical pressure as from the slips or the like.

It is further to be appreciated that while the sealing and testing method described herein is described and illustrated in connection with the sealing of pipe within a casing head, it might be employed in connection with the sealing and testing of the seals of pipe or the like within some other annular member, and it might be employed in connection with the testing of seals other than seals formed by welds such as illustrated and described.

It will be apparent however that a means has been provided whereby a pipe or the like may be sealed within a casing head or other annular member and the seal tested for leakage, as well as for accomplishing the other objects sought by this invention.

Having described my invention, I claim:

1. A well head assembly including a casing head, means to support a string of pipe therein, a radially extending annular member about said pipe above said means, a cap to hold said annular member in position, a seal carried by said annular member to engage and seal between it and the pipe, a bead of welding material in addition to and spaced from said seal and bonding the annular member to said pipe, and means to introduce pressure fluid about the pipe between the weld and seal to test the weld.

2. A well head assembly including a casing head, means to support a string of pipe therein, a radially extending annular member about said pipe above said means, a cap to hold said annular member in position, a seal carried by said annular member to engage and seal between it and the pipe, a bead of welding material in addition to and spaced from said seal and bonding the annular member to said pipe, and means to introduce pressure fluid about the pipe between the weld and seal to test the weld, said annular member having an upstanding neck portion.

3. A well head assembly including a casing head, means to support a string of pipe therein, a radially extending annular member about said pipe above said means, a cap to hold said annular member in position, a seal carried by said annular member to engage and form a seal between it and the pipe, a bead of welding material in addition to and spaced from said seal and bonding the annular member to said pipe, and means to introduce pressure fluid about the pipe between the weld and seal to test the weld, said seal including a packing holder welded in said annular member.

4. A well head assembly including a body, a string of pipe therein, a radially extending annular member to seat against said body about said pipe, and means bonding said annular member to said pipe and said head, a seal below said bonding means between said pipe and annular member, and means to test said means and seal by introducing pressure through said member.

5. In a well head assembly structure, an annular member adapted to receive a string of pipe, a string of pipe having a portion of its length disposed within said member, a pair of spaced seals between said pipe and said member, means for injecting a testing fluid under pressure into the space between said seals and about said pipe, and supporting means gripping said pipe entirely outside the space receiving such testing fluid.

6. In a well head assembly structure, an annular member adapted to receive a string of pipe, a string of pipe having a portion of its length disposed within said member, a pair of spaced seals between said pipe and said member, means for injecting a testing fluid under pressure into the space between said seals and about said pipe, and supporting means gripping said pipe entirely below the space receiving such testing fluid.

7. A casing head of the character described having a passage therethrough to receive a string of pipe, means on said head to form a pair of spaced seals about the pipe, said means including a groove in the wall of said passage and packing ring therein, and means to apply hydraulic pressure to said ring to form a seal about the pipe.

8. A casing head of the character described having a passage therethrough to receive a string of pipe, means on said head to form a pair of spaced seals about the pipe, said means including a groove in the wall of said passage and packing ring therein, and means to apply hydraulic pressure to said ring to form a seal about the pipe, said last mentioned means being in communication with the space between said seals to apply said hydraulic pressure between said seals to test the same.

9. In a well head assembly structure, a holder adapted to be supported by an outer string of pipe, pipe gripping and supporting means carried by said holder and adapted to grip and support an inner string of pipe, and an annular sealing and testing body part carried by said holder axially spaced from said gripping and supporting means, said body part having an opening adapted to embrace a string of pipe while engaged by said gripping and supporting means and having two axially spaced annular zones surrounding said opening, each of said zones having a surface extending away from the axis of said opening and being adapted to receive a seal forming material capable of providing an annular seal between the body part and a pipe positioned within said opening, said body part having a test fluid passageway connecting an exterior surface of the body part with the surface of the body part between said seal receiving zones.

RURIC N. BEAN.

REFERENCES CITED

The following references are of record in the file of this patent:

UNITED STATES PATENTS

| Number | Name | Date |
|---|---|---|
| 1,963,046 | Bouslog | June 12, 1934 |
| 2,207,469 | Roye | July 9, 1940 |
| 2,228,555 | Barker | Jan. 14, 1941 |
| 2,350,867 | Bean et al. | June 6, 1944 |
| 2,402,723 | Bean | June 25, 1946 |